Feb. 5, 1957 K. F. CHANNON, JR., ET AL 2,780,773
CONDUCTIVITY CELL
Filed Jan. 23, 1953 3 Sheets-Sheet 1
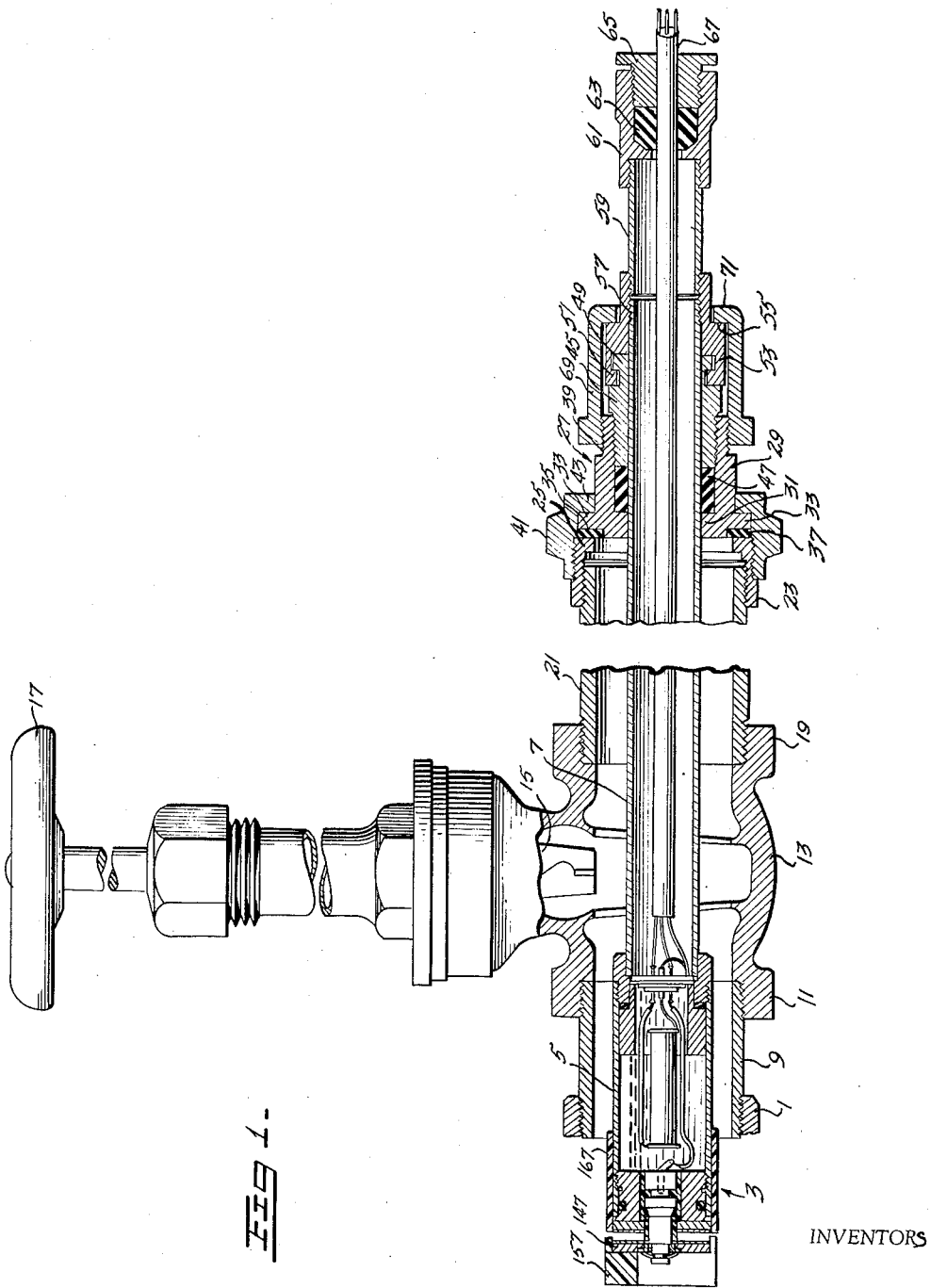
INVENTORS
Kenneth F. Channon
Weems E. Estelle Jr.
BY Peck & Peck
ATTORNEYS

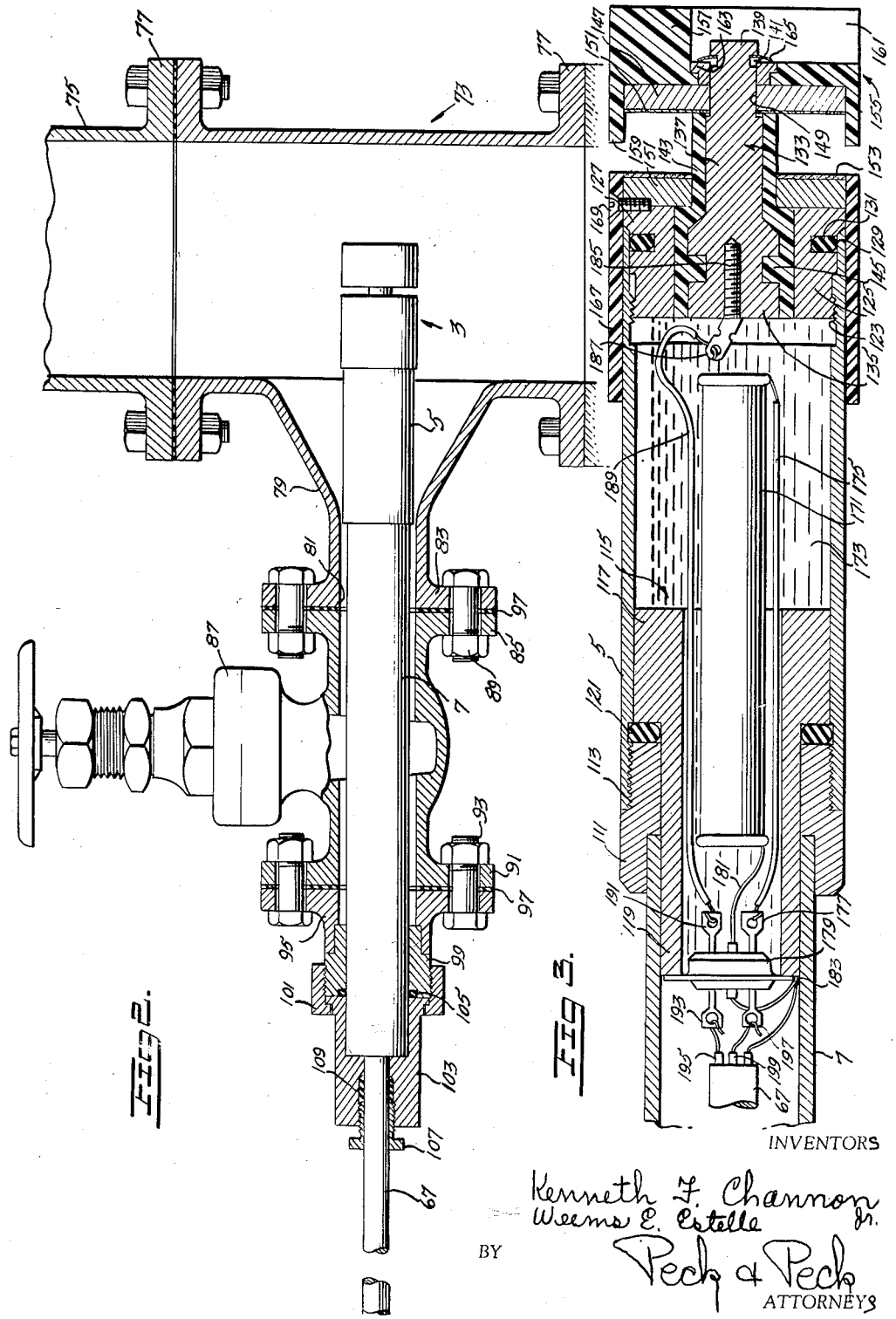

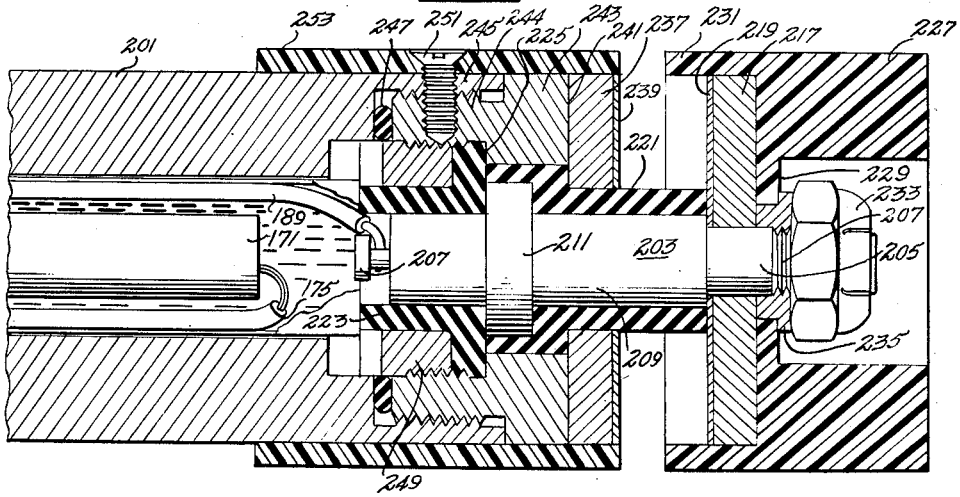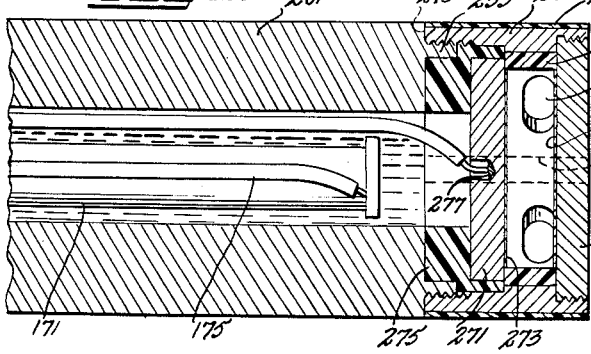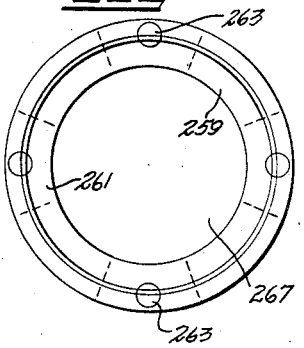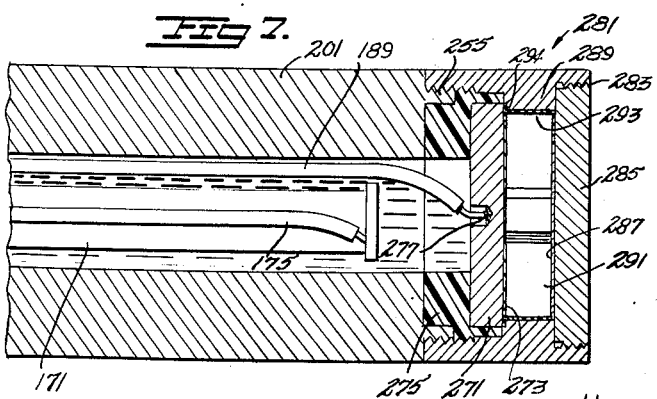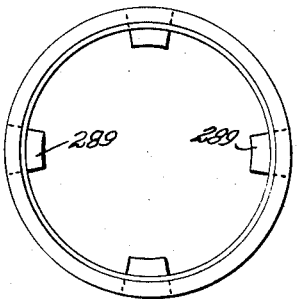

United States Patent Office 2,780,773
Patented Feb. 5, 1957

2,780,773

CONDUCTIVITY CELL

Kenneth F. Channon, Jr., College Park, and Weems E. Estelle, Annapolis, Md., assignors, by mesne assignments, to McNab, Incorporated, New York, N. Y., a corporation of New York Application January 23, 1953, Serial No. 332,982

8 Claims. (Cl. 324—30)

This invention relates broadly to the art of measuring the electrical conductivity of liquids resulting from contamination by electrical conducting impurities, and in its more specific aspects it relates to a cell adapted to be inserted in the solution whereby the current flowing through an electric circuit in the cell will vary with the conductivity of the solution; and the nature and objects of the invention will be readily recognized and understood by those skilled in the arts to which it relates in the light of the following explanation and detailed description of the accompanying drawings illustrating what we at present believe to be the preferred embodiments or mechanical expressions of our invention from among various other forms, arrangements, combinations and constructions, of which the invention is capable within the spirit and scope thereof.

Our invention has been particularly designed for marine use as a part of a system for measuring and indicating the concentration of salt in water flowing through conduits to boilers, engines, condensers and the like on ships, although it is adapted for use in other fields for indicating the concentration of electrical conductive impurities in various solutions.

Salinity indicating systems include one or more test or conductivity cells which are inserted into the boiler or the like feed system at locations which may be specified by the designer of the ship, and it is with these cells that our invention is concerned.

Conductivity cells of the general character to which this invention relates conventionally embody a pair of electrodes which are separated in space by a di-electric having the necessary insulating properties. The electrodes are adapted to be immersed in a solution to be tested, and when so immersed, an electric potential is impressed thereon and current flows from one electrode to the other in accordance with the conductivity of the solution. In order to compensate for variations in the temperature of the solution under test, compensators or thermistors may be used in the circuit within the cell.

The electrodes commonly used in conductivity cells of this character are of the pencil type and often the compensator is mounted within one of the pencil electrodes. There are various objectionable features and results inherent in the use of the pencil electrodes of the prior art which have been overcome by our use of disc electrodes and the mounting and arrangement thereof in a conductivity cell. It is highly desirable that the electrodes be so mounted and positioned within the cell that they will be in full and complete contact with the solution under test when immersed therein. This advantageous electrode positioning relative to the solution is accomplished by this invention for the disc electrodes are positioned adjacent the tip of the cell assembly where excellent and full contact with the solution is assured.

It is highly desirable that the field pattern be uniform between the electrodes in a device of this character as this produces advantageous and more accurate results. Many electrode arrangements in conductivity cells which are now known and in use provide no way to control the field pattern, the resulting field is not uniform and the results suffer thereby. This is particularly true of pencil type electrodes where there is no control of the field pattern, particularly at the tip of the assembly.

We have devised a conductivity cell embodying an electrode assembly wherein we provide means for controlling the field pattern and ensuring that it is uniform and we have accomplished this control while still permitting a full and complete contact of the solution with the electrodes.

We have also provided an electrode assembly which substantially reduces objectionable stray fields; we have accomplished this purpose by shielding adjacent materials which might otherwise be attractive to the electrical flow between the electrodes.

Many electrodes of the prior art are of the tubular type and are therefore difficult and expensive to apply an interior or exterior coating of platinum or other precious metal with which such electrodes are usually coated. The electrodes of this invention being of disc formation are easily and relatively cheaply coated with a precious metal, and have less area to coat than do many electrodes which are now known.

The disc type electrodes of this invention have substantially no points for lodging of matter which may be carried in the solution and therefore the operating characteristics are not affected by soiling and contamination as in many other types of electrodes being used for similar purposes.

One of the problems which have been met in conductivity cells is the sealing of the body thereof to prevent entry of the solution thereinto. Conductivity cells adapted for the uses which those of this invention are designed for often are subjected to pressures in the range of 150 p. s. i. and we have provided a tight assembly which will withstand such pressures without leaking or any other kind of breakdown.

We combine a compensator or thermistor within the assembly sealed in a leakproof housing and we have provided a unique and novel housing providing unusual heat transfer qualities.

When a conductivity cell is being installed in a conduit for immersion in the solution flowing therethrough, certain parts thereof, if exposed, are subject to damaging impact with the conduit walls. We have provided a protective means for that part of the cell which is most likely to be damaged during installation. We have accomplished this highly desirable result by so forming one of the necessary elements that it serves in a dual capacity, one of which is to provide a protective sheath for the vulnerable part of the cell.

The conductivity cell of this invention has also been designed to effect economies in manufacture and ease of assembly and maintenance and provides a compact and leakproof assembly able to withstand relative high pressures to which it may be subjected in use.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in elevation with parts thereof in section of the conductivity cell operatively associated with a valve assembly;

Fig. 2 is a view similar to Fig. 1 illustrating the conductivity cell operatively associated with another form of valve assembly;

Fig. 3 is a view in section of one form of conductivity cell;

Fig. 4 is a view in section of another form of conductivity cell and electrode assembly, with parts thereof broken away;

Fig. 5 is a view in section of a further form of conductivity cell and electrode assembly, with parts thereof broken away;

Fig. 6 is an end view in elevation of the conductivity cell illustrated in Fig. 5, with the outer electrode removed;

Fig. 7 is a view in section of another form of conductivity cell and electrode assembly, with parts thereof broken away;

Fig. 8 is an end view in elevation of the conductivity cell illustrated in Fig. 7, with the outer electrode removed.

Referring to the accompanying drawings, and particularly Fig. 1 thereof, wherein we have illustrated one satisfactory manner of mounting a conductivity cell in a liquid flow line for measuring the conductivity of the solution flowing therein. While in this particular embodiment or example of an application of our conductivity cell we have shown it applied to and extending within a liquid flow line, it is to be clearly understood that it is our contemplation that this invention may be used for testing stationary as well as flowing solutions and may, of course, be applied for testing the conductivity of various solutions to discover the concentration therein of the conducting material. We have used the numeral 1 to designate a wall of the liquid flow line or conduit about an opening into the conduit through which the conductivity cell is inserted into the flowing liquid. The conductivity cell which will be described hereinafter in detail is designated in general in Fig. 1 of the drawings by the numeral 3. The conductivity cell includes a brass housing 5 which is connected with an inner sleeve 7 of brass which forms the supporting means for the cell when it is in operative position immersed in a solution flowing within the conduit. The means connecting the housing and sleeve will be described when we proceed with the specific description of the conductivity cell itself.

One end of an exteriorly threaded nipple 9 is threaded into the liquid flow conduit element 1, and one end 11 of a valve union 13 is threaded on the other end of nipple 9. A conventional gate valve 15 having an operating handle 17 forms a part of the mounting assembly for the conductivity cell and its use therein will be made clear hereinafter. The other or what we shall term the inner end 19 of the valve union threadedly receives a further nipple 21 which threadedly receives on its inner end an annular reducer element 23 having an inner portion of its exterior surface threaded, and provided with an inwardly extending annular flange 25 projecting from the inner end thereof. We provide a packing retainer designated in its entirety by the numeral 27; this packing retainer consists of a sleeve-like body 29 provided on its inner end with inwardly and outwardly extending annular flanges 31 and 33, respectively, the outer flange 33 having a recess 35 formed therein from the outer periphery thereof inwardly and packing 37 such as asbestos packing is received in this annular recess. The inner end 39 of the packing reducer 27 is of reduced thickness and is exteriorly and interiorly threaded. The inwardly extending flange 31 of the packing retainer 27 engages and forms one support for the inner sleeve 7 of the conductivity cell. In order to prevent escape of the solution from the inner end of the space between inner sleeve 7 and nipple 21, we thread a nut 41 on the reducer 23, and at its inner end this nut is formed with a clamping flange 43 which, as the nut is threaded on the reducer engages the outer flange 33 of the packing retainer and forces that into compressing contact with packing 37 to thereby provide an efficient seal.

A further packing retainer ring 45 of less diameter than packing packing retainer 27 is threaded into the inner end thereof and its outer end abuts against and compresses a ring of packing material 47 against the inwardly extending radial flange 31 of member 27 to thereby prevent the escape of solution between inner sleeve 7 and the elements just described. The inner end of the packing retainer ring 45 is provided with a conventional bayonet formation 49 which coacts with a projection 51 on a ring 53 having a shoulder 55 thereon. The inner end of ring 53 is interiorly threaded and is threaded to the inner end of inner sleeve 7 as at 57. A separate sleeve section 59 is threaded into inner end of the ring 53 and at its other or inner end threadedly receives a stuffing box 61 containing rubber or the like packing 63 which is compressed therein by means of a gland nut 65, the stuffing box and gland nut being centrally apertured for receiving therethrough the cable conduit 67 which extends through sleeves 7 and 59 from the conductivity cell.

The ring 53 is maintained in operative position by means of a knurled locking nut 69 which is internally threaded at its inner end and is adapted to be mounted on the inner exteriorly threaded end 39 of packing retainer 27. At its other or inner end the nut 69 is provided with a radially inwardly extending annular flange 71 which in operative locking position engages shoulder 55 of ring 53 to maintain the ring in its operative position.

Consideration of Fig. 1 of the drawings shows that the assembly and mounting of the device with the cell or probe portion thereof projected into the flowing solution to be tested is such that the assembly is liquidtight and no liquid will leak therefrom. It is also apparent that we have provided an assembly and mounting arrangement which facilitates removal of the cell from operative testing position for inspection or repair and which reduces liquid escape during removal to a minimum.

When it is desired to withdraw or remove the conductivity cell from its operative testing position the locking nut 69 is unscrewed and completely removed from its threaded locking position on packing retainer 27, whereupon the ring 53 is given half a turn to release it from its position locked to packing retainer ring 45 and then pulled back to its limit at which point the cell itself will have been drawn inwardly past the gate valve 15. The gate valve is then closed. After closing the valve, the nut 41 is turned off and the entire assembly withdrawn.

In Fig. 2 of the drawings we have illustrated our assembly mounted in operative position in a different type of connection in a liquid flow conduit and with a different type valve from that disclosed in Fig. 1 of the drawings. In this form of our invention we have used the same reference characters as those used in Fig. 1 to describe similar parts. In this type of installation we have used a special T fitting designated generally by the numeral 73 which is fixed in a liquid flow conduit 75 by bolted flanges 77, or in any other suitable manner. This T branch connection is formed with a radially extending outwardly converging portion 79 forming a tubular mouth 81 through which the conductivity cell 3 and sleeve 7 as an assembly may be inserted for positioning the cell within the liquid for the testing thereof. The mouth 81 is formed with an annular flange 83 to which flange 85 of valve 87 is fixed by means of bolts or the like 89. The valve 87 is a flanged type valve and the inner flange 91 thereof is bolted as at 93 to a flanged element 95. Conventional gaskets 97 are compressed between the described flanges. An exteriorly threaded coupling 99 is sweated or otherwise fixed to flanged element 95, the internal surface of the coupling having a sliding fit with inner sleeve 7 of the cell assembly. A union ring 101 maintains a stuffing box 103 in abutting relationship with the inner surface of the coupling and a packing ring 105 is disposed in a grooved formed in the coupling. The cable 67 for the conductors extends through the stuffing box and a gland nut 107 compresses packing material 109. The assembly may be removed from operative testing position by unscrewing union 101 and after the assembly has been withdrawn the valve is closed.

This type of installation has been found satisfactory in certain systems and our assembly is as suitable for use with it as with the type illustrated in Fig. 1 of the drawings.

In Fig. 3 of the drawings we have illustrated one form of our conductivity cell mounted on the outer end of the inner supporting sleeve 7. The outer end of the sleeve is sweated within or otherwise suitably fixed to a connector ring 111 which is exteriorly threaded a distance from its outer end inwardly as at 113. An imperforate tubular housing member 5 formed of brass or other electric conductive material is interiorly threaded forwardly a distance from its inner end and in assembly is threaded on the threads 113 of the connector ring 111 so that the housing is mounted and supported on and projects forwardly from the connector ring.

A brass bushing designated in its entirety by the numeral 115 is formed with a forward or outer body portion 117 of substantially the same external diameter as the internal diameter of housing 5 and an inner sleeve-like portion 119 of reduced external diameter relative to the body portion, and the sleeve-like portion is formed with an external diameter substantially equal to the internal diameters of ring 111 and tube 7. The bushing 115 is mounted within the housing 5 and the abutting surfaces of the body portion thereof may be silver soldered together, the sleeve-like portion 119 of the bushing extends through ring 111 and into tube 7 and the abutting surfaces thereof may be soft soldered together. Between the opposing radial surfaces of body 117 of the bushing and ring 111 we position a gasket 121 in the form of an O ring which may be made of rubber or any suitable sealing material to provide a liquid proof joint between the members we have just described.

Inwardly spaced from the forward or outer end of the housing 5 we provide a series of internal threads 123 which threadedly receive and mount a support ring 125 which may be formed of brass. The support ring extends beyond the end of housing 5 and this extended portion is flared as at 127. An annular groove 129 is formed about the periphery of ring 125 and a sealing ring 131 or gasket of rubber or the like is seated in the groove and provides a tight seal between housing 5 and ring 125.

A mounting and supporting member or stud of brass designated generally by the numeral 133 includes a body portion 135, a reduced diameter neck 137 and a head 139 of reduced diameter relative to the neck. The head 139 of the stud 133 is provided with a circumferential groove 141 adjacent to but rearwardly spaced from the outer or forward end of the head. It will be evident from the drawings that the head of the stud in assembled position projects outwardly and is adapted for insertion into the solution to be tested.

In this form of our invention we mold a shield 143 of a plastic or other non-conducting material to and about the neck 137 and the body 135 of the stud, the shield having a radial inwardly extending flange 145 keyed in and to the body in an annular groove in the body of the stud.

The stud 143 forms a mounting and supporting means for the electrodes and for elements which seal the outer end of the housing 5 against the solution being tested, and the stud also forms a conducting path in the electrical circuit, all as will be described and made clear hereinafter.

We provide an electrode 147 having a central opening 149 therein and having its inner surface coated with platinum or the like 151. This electrode, which we shall term the outer electrode, is mounted on the head 139 of stud 133 by sliding the electrode on the stud with the head thereof extending through the opening 149. The electrode when in operative position mounted on the stud has its coated face abutting against the outer end of the shield 143 and may compress the same so that the coated face is closely adjacent the shoulder formed at the junction of the neck 137 and head 139 of the brass stud. The electrode is of flat circular configuration to form a disc element, and is preferably of a diameter substantially equal to that of the housing 5. An inner electrode 151 having a face coated with platinum or the like 153 is mounted on the neck 137 of the stud in position thereon pressing against the shield 143 at the shoulder formed by the junction of neck 137 and body 135 of the stud. The inner and outer electrodes are mounted on the stud in spaced relation with their operative coated faces in opposition.

The inner electrode is preferably of the same configuration and dimensions as the outer electrode to provide a circular plate or disc having flat faces. While we have described and illustrated the electrodes as being discs in this particular embodiment of our invention, it is to be understood that they may be of various configurations.

We provide an annular outer electrode shield member designated generally by the numeral 155 formed of an insulating material such as any suitable plastic, and this shield comprises a body member 157 of larger diameter than that of the outer electrode 147 and provided with a central opening therein for receiving therethrough the head 139 of the stud 133 as particularly illustrated in Fig. 3 of the drawings. A skirt or inwardly projecting annular flange 159, of insulating material which may be the same as the material of which the shield body is made, extends from the body 157 coextensive with the periphery thereof so that when the shield is mounted on the head of the stud with the body thereof in engagement with the outer plane surface of outer electrode 147 the annular skirt or flange will extend inwardly across and beyond the periphery of the electrode toward but spaced from the inner electrode 151.

The body 157 of the shield is provided with a slot 161 extending radially from the opening for the stud to the periphery of the body. The shield is maintained in operative position on the head of the stud by means of an insert 163 which is compressed against the shield by means of a removable retaining clip 165 which is mounted in groove 141 which is provided about the head of the stud.

It will be understood that the retaining clip is accessible to a screw driver or the like because of slot 161 which we provide in the body of the shield.

The body 135 of the stud with the insulating material 143 is mounted within the ring 125 so that the neck 137 and head 139 project outwardly therefrom concentrically with respect to housing 5.

We provide a shielding sleeve or sheath 167 which extends from the inner electrode 151 inwardly encompassing the flared portion 127 of ring 125 and the outer end of housing 5. This shielding sleeve may be formed of any suitable insulating material and is preferably formed of a suitable plastic. The shields 155 and 167 are of course formed of a material which is inert to the solution being tested. The shield 167 may be fixed in position by means of a screw 169 which also fixes inner electrode in position abutting and in constant contact with support ring 125.

A thermistor or compensator 171 is mounted within the housing 5 within a body of silicon oil 173 or other suitable heat transfer agent. The silicon oil not only functions as an agent for conducting heat to and from the thermistor but it also mechanically supports the thermistor in position within the housing. The thermistor is connected into the circuit by means of cable 175 which is connected to a terminal 177 of a three terminal header 179 which is soldered to the inner end or sleeve-like portion 119 of bushing 117 and by means of cable 181 which extends through the header and makes contact with the bushings as at 183.

The outer electrode 147 is connected into the electric circuit of the device by means of a screw 185 which is screwed into a hole tapped into the body 135 of the stud and carries a terminal lug 187 thereon to which is connected an electric cable 189 which runs to terminal 191.

The electrodes and thermistor are connected into the circuit in the following manner: from outer electrode 147 through stud 133, screw 185, cable 189, terminal 191 and through header and terminal 193 to cable 195. The inner electrode 151 is connected into the circuit through ring 125, housing 5, connector ring 111, sleeve 7 to contact 183 and cable 197. The thermistor is electrically connected to the inner electrode by means of cable 181 and contact 183 and into the circuit by means of cable 175, terminal 177, through the header to terminal 197 and to cable 199.

When the conductivity cell of this invention is in operative position with the electrode assembly and at least a portion of the housing 5 immersed in a flowing solution within a conduit or the like, it will be apparent that the inner coated face of the outer electrode and the outer coated face of the inner electrode are in position for contact with the solution. The spaced relation of the inner and outer electrodes is such that sufficient solution may flow through and about this space to fully and completely contact the operative surfaces of the electrodes. We have devised novel means for successfully controlling the field pattern between the coated surfaces of the two electrodes and by this control means we are enabled to substantially eliminate stray fields and to maintain the field pattern substantially uniform which, of course, is highly advantageous in the resulting accuracy of the tests being made.

In order to shield and protect the outer end of the brass housing 5 against interference with the field pattern between the electrodes, we have provided the tubular sleevelike shield member 167 which is formed of any suitable di-electric material which is inert to the action of the solution under test. This shield prevents disruption of the field pattern and prevents the housing from functioning as an electrode itself complementary to the outer electrode 147.

As a further restraining medium against stray fields and the bulging thereof to thereby maintain the field pattern uniform, we have reduced the dimension of the exterior annular opening for flow of solution between the inner and outer electrodes by means of the inwardly extending flange 159 of the outer flange shield 155. This flange 159 does not extend inwardly toward the inner electrode a sufficient distance to restrict the flow of solution between the electrodes in an amount sufficient to reduce the contact of the liquid with the operative faces of the electrodes, but does function to aid in keeping the field pattern uniform between the electrodes.

Another highly desirable feature of the mounting and assembly of the electrodes and the shields therefor resides in the dual function which is performed by the outer electrode shield 155. When a conductivity cell of the general type of the one involved in this invention is being mounted or installed to extend into a liquid flow conduit, the outer electrode if unprotected, may be knocked or forced against the walls of the opening into the conduit and thereby damaged. This possibility of installation or removal damage to the outer electrode assembly has been eliminated by our construction wherein the body portion 157 of the outer electrode shield 155 serves to cover and protect the outer electrode from damage resulting from being knocked against the walls of the inlet to the conduit.

The described arrangement and mounting of the electrodes on the stud and the stud within and projecting from the outer end of the housing has been designed not only to produce the desired field pattern between the electrodes but also to provide a sealed and leakproof assembly and structural arrangement to prevent the solution being tested from gaining access into the tubular housing member 5 in which the thermistor or compensator is housed.

In Fig. 4 of the drawings we have illustrated another and preferred form of electrode mounting arrangement and means for preventing leakage of solution into the compensator housing and we have also illustrated in this figure of the drawings a further form of compensator housing which functions most satisfactorily in the transfer of heat to and from the compensator. In Fig. 4 of the drawings we have used similar reference numerals to those used in Figs. 1, 2 and 3 to designate parts which are the same.

We have devised a compensator housing 201 which is constructed of brass or similar electrical conductive material, and is formed with relatively thick walls for good transfer of heat to and from the solution being tested and the compensator 171. We may make this compensator housing in this form by drilling a hole centrally of and into a brass rod to thereby provide the thickened heat conducting walls of the housing. The compensator 171 of this form of our invention is mounted in a body of silicon oil 173 or similar heat transfer agent which also functions to mechanically support the compensator. The compensator housing 201 is mounted and connected to the inner sleeve 7 in generally the same way that the housing 5 of the form of the invention illustrated in Fig. 3 is mounted and connected to the inner sleeve.

We provide a brass electrode supporting stud designated in its entirety by the numeral 203 and this stud includes an outer head 205 which is threaded as at 207 and the stud includes a generally elongated body section 209 having a radially extending annular rib or flange 211 extending therefrom. At the inner end of the stud 203 we provide a terminal lug 207 which is fixed to and in electrical contact to the stud and receives thereabout the electric cable 189 which as in the previously described form of our invention extends to a terminal of the header plug.

The outer electrode 217 is of circular platelike configuration to form a disc having the inner surface thereof coated with platinum or the like precious metal 219 and the outer electrode is provided with a central opening therethrough which receives the head 205 of the stud when the electrode is mounted in operative position thereon. The stud body section is encompassed with a pair of bushings 221 and 223 of insulating material, the insulating bushing 221 being shaped to extend over the annular rib 211 of the stud and the bushing 223 being formed to extend inwardly beyond the inner end of the body of the stud and at its opposite end being formed with an annular outwardly extending flange 225. The bushing 221 is formed of an electrically non-conductive material which is non-water absorbent and is capable of withstanding temperatures of the order of 300° F. We have found that trifluorochloroethylene which is marketed under the trademark "Kel-F" is a material from which the bushing 221 may be satisfactorily formed. The bushing 223 is formed of a rubber-like material such as silicone rubber which has the required characteristics of being a good electric insulator, elastic, non-water absorbent and capable of withstanding temperatures of the order of 300° F.

We provide a shield of di-electric material such as nylon or other suitable plastic which comprises an annular ring-like body portion 227 having a radially inwardly extending flange 229 thereon and a skirt or annular flange 231 extends from the inner surface of the ring 227 coextensive with the periphery thereof. When the outer electrode 217 is mounted in position on the stud, the shield is mounted on the stud so that the flange 229 and the ring 227 are in abutting association with the outer surface of the outer electrode 227 and the skirt or flange 231 extends inwardly beyond the inner coated surface 219 of the outer electrode. The shield and the electrode are maintained in mounted operative position by means of an elastic stop nut or the like 233 which is threaded on the outer end of the head 205 of the stud and compresses a bushing 235 against the flange 229 of the shield and against the outer surface of the outer electrode 217.

We provide an inner electrode 237 which is of circular platelike configuration forming a disc and is of substantially the same dimensions as the outer electrode 217. The outer or operative face of the electrode 237 is coated with platinum or the like precious metal and the electrode is provided with a central opening therethrough for receiving the body 221 of the stud 203 on which the inner electrode is mounted in spaced relation relative to the outer electrode 217. As in the form of our invention described hereinabove the coated operative faces of the two disc electrodes are in opposition and are spaced apart a field pattern area between the two electrodes.

The inner electrode 237 is fixed in operative position on the body of the stud by being soldered as at 241 to the outer face of the body 243 of a bushing of brass which is provided with a ringlike portion 244 having internal and external threads thereon. The ringlike portion 244 of the bushing when in operative position is threaded into the threaded outer end 245 of the housing 201 and the inner end of the ringlike portion 243 of the bushing bears against and compresses an O ring 247 between the thickened wall of the housing 201 and the body portion 243 of the bushing. The O ring 247 may be made of silicone rubber and capable of withstanding relative high temperatures. The complete sealing and leakproofing of the various members described is additionally accomplished by means of a threaded retaining plug 249 which is threaded into the ring 244 of the bushing so that the flange 225 of the rubber bushing 223 is compressed between the retaining plug and the body 243 of the bushing. We provide a locking screw 251 which maintains the bushing threaded within the outer end of the housing 201.

As in the form of our invention disclosed in Figs. 1 to 3 of the drawings we provide an insulating sleeve or sheath 253 formed of nylon plastic or other suitable material and mounted to extend about the assembly from the outer surface of the inner electrode inwardly to cover a portion of the outer end of the housing 201. The insulating sleeve 253 is maintained in operative position covering the outer end of the housing, the body 243 of the bushing and the peripheral portions of the electrode 237, by means of the screw 251 which extends therethrough.

It will be apparent that the function of the insulating ring 227 and its skirt or flange portion 231 in protecting the outer end of the stud and the nut against damage and in maintaining the field pattern uniform between the two electrodes is the same as those described in connection with the invention illustrated in Figs. 1, 2 and 3. In similar manner the sheath or sleeve 253 functions in generally the same manner as the sheath or sleeve 167 disclosed in Fig. 3 of the drawings. We have found that the use of the insulating and sealing bushings 221 and 225 which are compressed between certain elements of the assembly produce a highly satisfactory result and substantially eliminate the possibility of leakage of the solution being tested into the interior of the housing 201 which mounts the thermistor.

The outer electrode 217 is electrically connected in the circuit through the stud 203, the terminal 207 and the cable 189 which cable is connected into the circuit in the same way the same cable is connected into the circuit in the arrangement shown in Fig. 3 of the drawings. The inner electrode 237 is connected into the circuit through bushing body 243 with which it is in electrical contact and through the housing 201 due to the fact that the outer end 245 thereof is in electrical contact with the body portion of the bushing. The remaining electric circuit for the inner electrode is the same as that disclosed in Fig. 3 of the drawings wherein the housing 5 which corresponds to the housing 201 of Fig. 4 is associated in the circuit at the contact point 183 of Fig. 3 of the drawings. The thermistor of Fig. 4 of the drawings is connected into the circuit in exactly the same manner as the thermistor of Fig. 3 of the drawings.

In Figs. 5 and 6 of the drawings we have illustrated a further form of electrode mounting and assembly and we have used the same reference characters as used hereinabove to designate similar parts.

The compensator housing 201 is formed with a reduced diameter externally threaded outer end 255 which is adapted to mount the outer electrode assembly in the following manner. We provide an electrode mounting cap 257 which is interiorly threaded for mounting on the threaded end 255 of housing 201. The electrode mounting cap is made of a non-conductive material such as a suitable plastic and is formed with an internal rib 259 from which a plurality of spaced lugs 261 project outwardly. We provide a series of brass conducting rods 263 which extend from the outer to the inner edge of the electrode mounting cap through the lugs 261. The inner surfaces of the conducting rods are exposed and threaded to match the threading of the cap. The cap is formed with a series of circumferentially spaced apertures 265 therein for flow of the solution therethrough as will be explained. We provide an outer electrode 267 having a threaded periphery, the electrode in operative assembled position being screwed into the cap with its platinum coated face 269 directed inwardly and abutting against the lugs 261. It will be evident that the electrode will be in contact with each of the conducting rods 263 and the operative coated face of the electrode will be adjacent the apertures 265.

The inner electrode 271 having a coated surface 273 is mounted in and bonded to an insulating member 275 which is partly received in the end of the housing 201. In assembly the member 275 carrying the inner electrode 271 is seated in the end of the housing and the plastic cap 257 carrying the outer electrode is screwed on end 255 of the housing until the rib 259 abuts the insulating member 275 and holds it in position within and extending from the end of the housing. The inner electrode is connected to the circuit by soldering or otherwise securing cable 189 thereto as indicated at 277.

In the electrode assembly illustrated in Figs. 5 and 6 of the drawings the outer electrode is electrically connected into the circuit through the conducting rods 263 with which it is in contact. The inner ends of the rods are in abutting contact with the housing 201 as at 279 and the housing is connected into the electric circuit in the same way as in the other forms of our invention.

In the form of our invention illustrated in Figs. 5 and 6 of the drawings it will be recognized that the insulating plastic material of the cap will produce no disruption of the field pattern between the electrodes so that said pattern will be uniform. It will also be evident that excellent contact of the solution with the coated surfaces of the electrodes will be obtained because of the apertures 265 which permit the solution to flow through the cap adjacent to the coated surfaces.

In Figs. 7 and 8 of the drawings we have illustrated a further form of electrode mounting assembly and in these figures we have used the same reference numerals as those used in connection with the other figures to describe similar parts. The housing 201 is formed with a reduced diameter threaded inner end 255 which is adapted to receive thereon a cap designated in its entirety by the numeral 281 which cap is formed of an electrical conductive material such as brass and is provided on its outer end with an interiorly threaded portion 283 for receiving therein a circular plate or disc electrode 285 which we shall term the outer electrode and which is provided with the usual coated surface 287. The cap 281 is provided with circumferentially spaced inwardly projecting lugs or stops 289. Between the lugs 289 the cap is apertured as at 291 and the inner surfaces of each lug member are coated with an insulating layer of plastic or the like 293 and the inner or rearward surfaces of said stops are also coated with the insulating material as at 294. We mount an inner disc electrode 271 having a coated surface 273 within an insulating cup 275 which is mounted within the end of the housing 201 and provides an insulating medium between the inner electrode 271, the cap 281 and the end 255 of the housing 201 as will be apparent from a consideration of Fig. 7 of the drawings. It will be understood that the cap 281, in which is threadedly mounted the outer electrode 285, is screwed on the end 255 of the housing until the lugs or projections 289 abut against the coated surface of electrode 271; however, since this inner or rear surface of each lug is coated with an insulating material as at 294, there will be no electric contact between the lugs and the inner electrode.

When the elements are mounted as described, the outer electrode 285 is associated in the electric circuit through the cap and the end of the housing 255 and the housing 201 and from thence into the circuit in the same manner that the housing 5 of Fig. 3 of the drawings is connected into the circuit. It will be apparent that the elements of the assembly, by means of which the outer electrode 285 is connected into the circuit, are insulated from and not in electric contact with the inner electrode 273. The inner electrode 273 is associated in the electric circuit by means of the cable 189 which is electrically connected with the electrode as at 277, the cable 189 corresponding to the cable so designated in Fig. 3 of the drawings.

It will thus be seen that the insulating coating 293 and 294 provides not only an insulating means between the two electrodes but also functions as a shield preventing disruption of the uniform field pattern between the two electrodes.

It will be evident from the descriptions of the various forms of our invention that we have evolved a practical and compact assembly constituting a conductivity cell, one which is leakproof, easy to install and maintain and in which the field pattern between the electrodes will be uniform.

We claim:

1. A conductivity cell including a housing member, electrode supporting means extending from said housing member and disc electrodes co-axially mounted in spaced relation on said electrode supporting means, the housing member and the disc electrodes adapted to be immersed in a solution to be tested and the opposing faces of said disc electrodes being the sole areas thereof open to contact with the solution, and means extending from the periphery of one of said disc electrodes toward but spaced from the other of said disc electrodes to control the field pattern between the disc electrodes and means for electrically connecting said disc electrodes to electric circuit lead-in conductors.

2. A conductivity cell including a housing member, electrode supporting means extending from said housing and a pair of electrodes co-axially mounted in spaced relation on said electrode supporting means, the housing member and the electrodes adapted to be immersed in a solution to be tested for contact of the solution with the housing member an for flow of the solution between the electrodes, and means extending from one electrode toward but spaced from the other electrode to control the field pattern between the electrodes, and means for electrically connecting said disc electrodes to electric circuit lead-in conductors.

3. A conductivity cell including a housing member of electric conductive material, electrode supporting means extending from said housing and a pair of electrodes co-axially mounted in spaced relation on said electrode supporting means, the housing member and the electrodes adapted to be immersed in a solution to be tested for contact of the solution with the housing member and for flow of the solution between the electrodes, and means extending from one electrode toward but spaced from the other electrode to control the field pattern between the electrodes, and a shield extending from said other electrode rearwardly about the forward portion of said housing member, and means for electrically connecting said disc electrodes to electric circuit lead-in conductors.

4. A conductivity cell including a housing member, electrode supporting means supported by said housing and extending forwardly therefrom, an outer electrode mounted on said electrode supporting means adjacent to but rearwardly spaced from the forward end thereof and a further electrode mounted on said electrode supporting means in position thereon rearwardly spaced from said outer electrode, and means mounted on said electrode supporting means and shielding that portion of the electrode supporting means forwardly of said outer electrode, and said means being provided with a portion extending rearwardly to a position in the radial plane of the area between the electrodes and means for electrically connecting said electrodes to electric circuit lead-in conductors.

5. A conductivity cell including a housing member, electrode supporting means supported by said housing and extending forwardly therefrom, an outer electrode mounted on said electrode supporting means adjacent to but rearwardly spaced from the forward end thereof and a further electrode mounted on said electrode supporting means in position thereon rearwardly spaced from said forward electrode, and shielding means mounted on said electrode supporting means and extending forwardly beyond the forward end thereof.

6. A conductivity cell in accordance with claim 5, wherein said shielding means covers the outer surface of said outer electrode.

7. A conductivity cell including a housing member, a stud supported by said housing and extending forwardly therefrom, an outer disc electrode mounted on said stud adjacent to but rearwardly spaced from the forward end thereof and a further disc electrode mounted on said stud in position rearwardly spaced from said outer electrode, annular shielding means mounted on said stud and extending forwardly beyond the forward end of the stud and said shielding means formed with a radial slot therein exposing the forward end of the stud.

8. A conductivity cell including a housing member, electrode supporting means extending from said housing and disc electrodes mounted in axially spaced relation on said electrode supporting means, said housing member and disc electrodes adapted to be immersed in a solution to be tested, and each electrode having a plane electrical conduction surface and said electrical conduction surfaces facing each other, and each such plane electrical conduction surface constituting the sole electrical conduction surface on each electrode which is in contact with the solution to be tested, and means for electrically connecting said disc electrodes to electric circuit lead-in conductors.

References Cited in the file of this patent

UNITED STATES PATENTS

| Re. 23,282 | Thomson | Oct. 10, 1950 |
| --- | --- | --- |
| 1,670,640 | Smith | May 22, 1928 |
| 2,213,209 | De Lange et al. | Sept. 3, 1940 |
| 2,215,213 | Ellis | Sept. 17, 1940 |
| 2,250,471 | De Bruin | July 29, 1941 |
| 2,328,853 | Sherrard | Sept. 7, 1943 |
| 2,345,071 | Reynst et al. | Mar. 28, 1944 |
| 2,525,754 | Albrecht | Oct. 17, 1950 |
| 2,560,209 | Borell et al. | July 10, 1951 |
| 2,611,007 | Cade et al. | Sept. 16, 1952 |
| 2,653,294 | McMillan | Sept. 22, 1953 |
| 2,654,862 | Petersen | Oct. 6, 1953 |